US009098543B2

(12) United States Patent
Vuong et al.

(10) Patent No.: US 9,098,543 B2
(45) Date of Patent: Aug. 4, 2015

(54) ATTRIBUTE DETECTION

(71) Applicant: Wal-Mart Stores, Inc., Bentonville, AZ (US)

(72) Inventors: Ba-Quy Vuong, Foster City, CA (US); Abhishek Gattani, Sunnyvale, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 129 days.

(21) Appl. No.: 13/804,806

(22) Filed: Mar. 14, 2013

(65) Prior Publication Data

US 2014/0280201 A1 Sep. 18, 2014

(51) Int. Cl.
*G06F 17/30* (2006.01)

(52) U.S. Cl.
CPC ........ *G06F 17/3033* (2013.01); *G06F 17/3043* (2013.01); *G06F 17/30401* (2013.01)

(58) Field of Classification Search
None
See application file for complete search history.

(56) References Cited

U.S. PATENT DOCUMENTS

| | | | | |
|---|---|---|---|---|
| 6,243,713 | B1 | 6/2001 | Nelson | |
| 7,080,059 | B1 | 7/2006 | Poston | |
| 7,085,763 | B2 | 8/2006 | Ochiai | |
| 7,296,009 | B1 | 11/2007 | Jiang | |
| 7,526,476 | B2 | 4/2009 | Naam | |
| 7,546,289 | B2 | 6/2009 | Westphal | |
| 7,693,825 | B2 | 4/2010 | Wang | |
| 7,899,666 | B2 | 3/2011 | Varone | |
| 8,019,650 | B2 | 9/2011 | Donsbach | |
| 8,065,145 | B2 | 11/2011 | Okamoto | |
| 8,073,869 | B2 | 12/2011 | Li | |
| 8,095,476 | B2 | 1/2012 | Bierner | |
| 8,117,144 | B2 | 2/2012 | Angell | |
| 8,156,138 | B2 | 4/2012 | Kohn | |
| 8,239,370 | B2 | 8/2012 | Wong | |
| 8,239,394 | B1 * | 8/2012 | Hogue et al. | 707/754 |
| 8,290,925 | B1 | 10/2012 | Anandan | |
| RE43,835 | E | 11/2012 | Knight | |
| 2005/0021508 | A1 * | 1/2005 | Matsubayashi et al. | 707/3 |
| 2007/0174258 | A1 * | 7/2007 | Jones et al. | 707/3 |
| 2007/0208724 | A1 | 9/2007 | Madhavan et al. | |
| 2011/0231395 | A1 | 9/2011 | Vadlamani et al. | |
| 2013/0018659 | A1 | 1/2013 | Chi | |

FOREIGN PATENT DOCUMENTS

WO WO2006104951 A1 10/2006

OTHER PUBLICATIONS

"Bloom Filter—Wikipedia, the free encyclopedia", Internet Citation, Mar. 1, 2009, pp. 1-10, XP002539588.

* cited by examiner

*Primary Examiner* — Son T Hoang
(74) *Attorney, Agent, or Firm* — Bryan Cave LLP

(57) ABSTRACT

Computer-implemented methods and systems may be used for identifying an attribute and/or attribute value in a text string. In embodiments, the text string comprises a search query submitted by a user. Embodiments of the present disclosure include identifying an attribute value from a search query by comparing the search query string to a list of known attribute values and comparing the candidate attribute value to a knowledge base to confirm that the string represents an attribute value rather than a non-attribute concept. In embodiments, a Bloom filter is employed to execute a relatively efficient comparison between a candidate attribute value and known non-attribute concepts.

20 Claims, 4 Drawing Sheets

ATTRIBUTE DETECTION

RELATED U.S. APPLICATION

This application is related to U.S. application Ser. No. 13/827,075, filed Mar. 14, 2013. The application is incorporated herein by reference for all purposes.

BACKGROUND

In general, information extraction technology is directed at detecting structured data within unstructured data. For example, a string of text may include one or more attributes of an item. The text may be parsed and analyzed to extract those attributes. However, current information extraction technologies may lack the refinement to differentiate between attributes and phrases that merely contain words that appear to represent an attribute. In a search engine, this deficiency may produce undesirable responses to a search query. For example, a user search query may include the string "redwood." A conventional search engine may parse the word "red" from the search query, recognize the word as a color attribute value, and return items having the attribute value "red." Such a response is not desirable and was likely not what the user was searching for.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
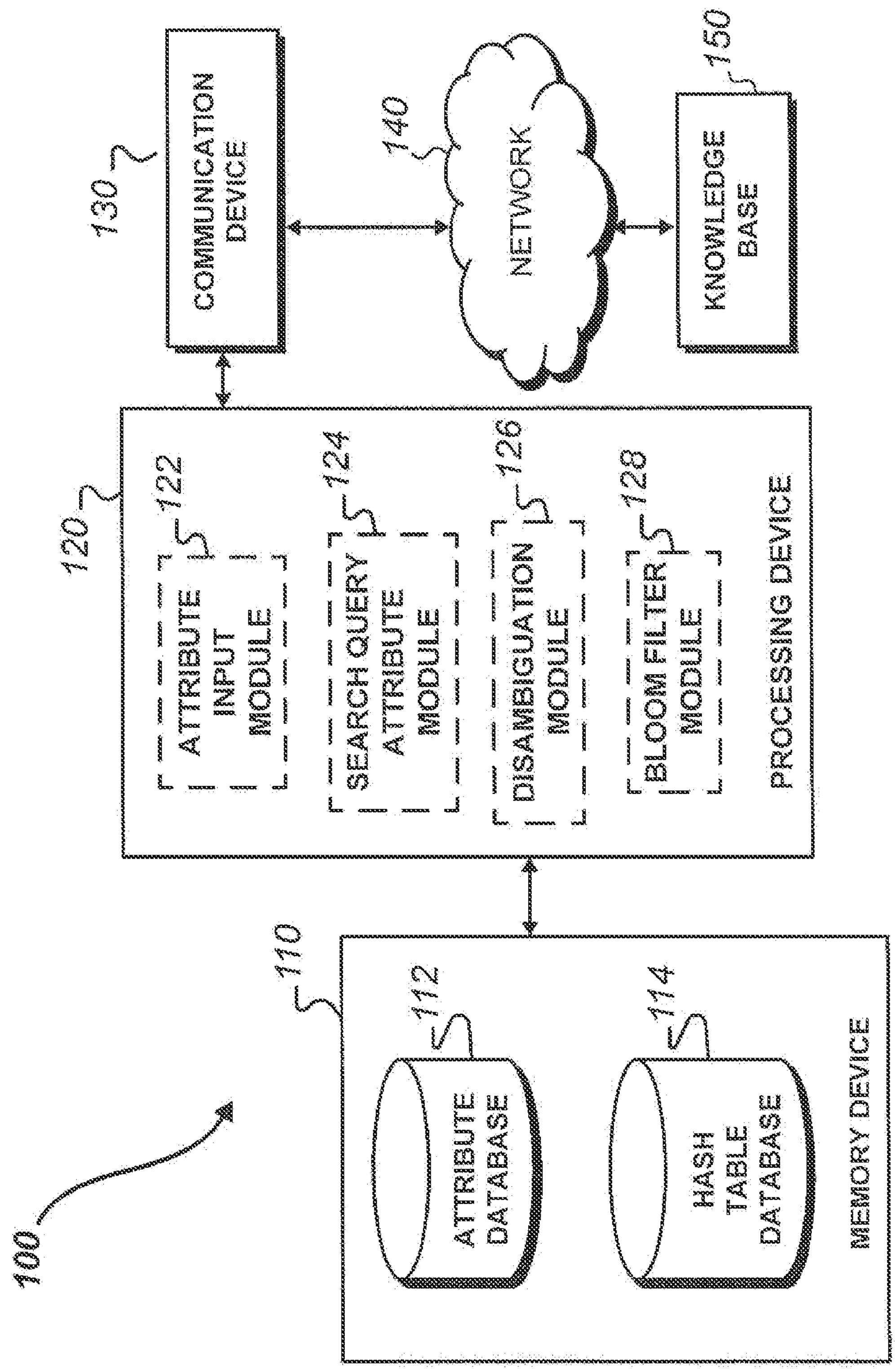
FIG. 1 is a block diagram illustrating components of an attribute detection system 100 according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for detecting attributes in a search query or other text string and returning search results most relevant to the query. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments of the present disclosure are directed to detecting attributes in search queries or other text strings. By accurately identifying attributes in a search query, more relevant query response objects may be returned to the user that submitted the query. As used herein, attributes may refer to characteristics and/or qualities of items for sale and/or described on a website. Such items may include products, services, or a combination thereof. Products may include, but are not limited to: groceries, foods, office supplies, clothing wares, any other fungible goods sold by a retailer, commercial products, industrial goods, and the like. Non-limiting examples of product attributes include color, size, and brand. Services may include, but are not limited to: professional services, financial services, medical services, business services, educational services, travel, lodging services, repair services, and other types of services. In general, a provider of products and/or services may be referred to herein as a merchant. A merchant may typically operate and manage the systems disclosed and described herein or may enter into service agreements with third parties to operate and manage the systems on their behalf.

Referring now to FIG. 1, an attribute detection system 100 of the present disclosure comprises a memory device 110, processing device 120, and communication device 130. Memory device 110 comprises attribute database 112 and hash table database 114. Processing device 120 comprises attribute input module 122, search query attribute module 124, disambiguation module 126, and Bloom filter module 128. Attribute detection system 100, memory device 110, attribute database 112, hash table database 114, processing device 120, attribute input module 122, search query attribute module 124, disambiguation module 126, Bloom filter module 128, and/or communication device 130 may refer to one or more servers or other type of computing devices that operate in an individual or distributed manner as will be described in detail below.

In embodiments, attribute database 112 is adapted to store attributes and potential values for each attribute. As an example, a product attribute may be "color" and associated attribute values associated with that attribute may include "red," "green," "blue," etc. Hash table database 114 comprises a Bloom filter table. In embodiments, hash table database 114 comprises a data structure adapted to indicate if selected attribute values (such as those stored in attribute database 112) cannot be found in one or more knowledge bases, including external knowledge bases 150, as will be described in further detail below. In embodiments, hash table database 114 comprises a hash table of a set of non-attribute concepts found in a knowledge base.

In embodiments, attribute input module 122 comprises a processing module adapted to receive attributes and/or attribute values. In embodiments, attribute input module 122 can receive attributes and attribute values from an operator of system 100. In embodiments, an operator may be an agent and/or employee of the merchant. Attributes and attribute values may be received by attribute input module 122 via a graphical user interface that can be transmitted via communication device 130 and network 140 and presented to the operator on an operator computing device. In embodiments, the operator computing device comprises a personal computer, a handheld device, a tablet device, or other electronic device. In embodiments, the operator computing device stores application-specific software installed thereon that is adapted to communicate with communication device 130 via network 140. In embodiments, operator computing device is adapted to input attributes and attribute values as described herein through a web browsers interface. In alternative embodiments, attribute input module 122 can receive attributes and attribute values from a product database or unstructured data that contains information regarding such attributes. Attribute input module 122 is adapted to transmit attributes and values into attribute database 112.

Search query attribute module 124 is adapted to receive item search queries submitted by users. Such queries may be submitted at user interfaces in a merchant software application installed on a mobile computing device (which may generally be referred to as an "app"), in a web browser displaying a website, or by other means. In response to receiving an item query from a user, search query attribute module 124 can query attribute database 112 for matches between parsed text in the query and attribute values in database 112. In alternatives, search query attribute module 124 also searches for matches between query text strings and both attribute values and attributes themselves in database 112. In embodiments, search query attribute module 124 can parse a search query text into individual words to test for matches at attribute database 112, or may alternatively parse the search query text into various combinations of words, fragments of words, and alternate words or phrases using standard dictionaries to enhance accuracy for attribute value searching.

Disambiguation module 126 is adapted to determine if a text string from a search query that was matched in database 112 may also be a non-attribute concept. For example, a search query including the phrase "Red Sox shirt" is probably not intended by the user to be a search for a shirt having the "red" attribute value, but rather for a shirt carrying a logo of the baseball club. Disambiguation module 126 can compare the search query string, or selected parts thereof, against a knowledge base to determine if what appears to be an attribute and/or attribute value may actually represent a non-attribute concept. In embodiments, the knowledge base may include a public external knowledge base 150 such as Wikipedia, Freebase, or like knowledge repository. By checking a phrase that contains an apparent attribute value against the knowledge base 150, disambiguation module 126 may confirm whether or not a phrase that was matched by search query attribute module 124 is an attribute, an attribute value, or a non-attribute concept. In circumstances where a relatively faster and/or less resource-intensive verification means is desirable, disambiguation module 126 can process strings from a search query through a hash function and check against Bloom filter table 114. If a match is not found in Bloom filter table 114, it may be ascertained that the search query text does not represent a non-attribute concept. Disambiguation module 126 is adapted to transmit appropriate search result objects based on its determination of whether a search query text string was found to contain an attribute value.

In embodiments, Bloom filter module 128 is adapted to create a Bloom filter table corresponding to a set of non-attribute concepts. Bloom filter module 128 can process text strings representing non-attribute concepts through a hash function and enter the result into a Bloom filter table at hash table database 114. To initialize the Bloom filter table, Bloom filter module 128 can crawl knowledge base such as Wikipedia, Freebase, or the like for non-attribute concepts. Upon identifying a non-attribute concept, Bloom filter module 128 may enter one or more string representations of the concept into the hash table database 114 as described above.

Communication device 130 is adapted to transmit computer-readable instructions and data over network 140 to other computer systems as directed by the processing device 120. As used in the present disclosure, "network" 140 can refer to any communication network including, but not limited to, a wireless network, a cellular network, an intranet, the Internet, or combinations thereof. Communication device 130 can communicate with computing devices used by users to input data and/or receive outputs from system 100. Such user computing devices may comprise personal computers, handheld devices, tablet devices, or other like electronic devices. In embodiments, computing devices store application-specific software installed thereon and adapted to communicate with system 100. In alternative embodiments, operations described herein are effected through web browsers via graphical user interfaces adapted to collect and disseminate information as directed by processing device 120. In embodiments, communication device 140 is adapted to communicate with other systems operated by the merchant to effect user search queries as set forth herein.

Figure 2:
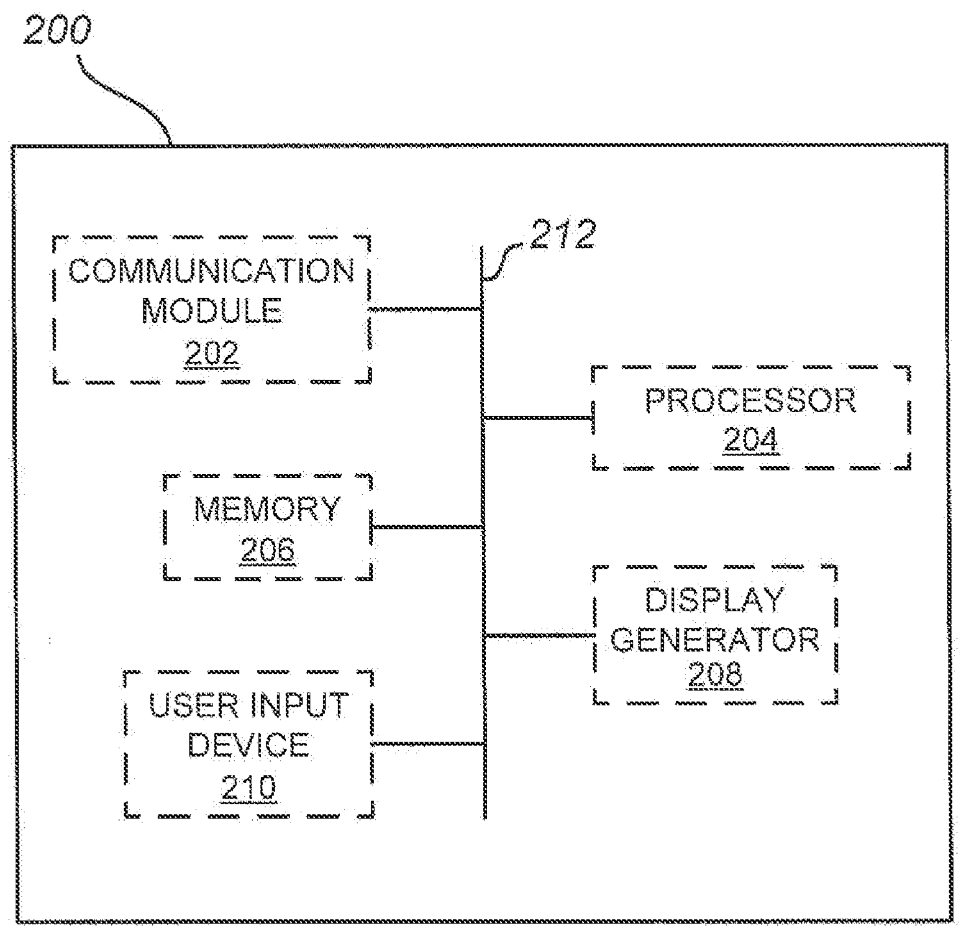
FIG. 2 is a block diagram depicting an embodiment of a user device.

FIG. 2 is a block diagram depicting an embodiment of user device 200. User device 200 can be operated by a user to interact with system 100 to search for products or services, obtain information about various products or services, place orders, and the like. User device 200 includes a communication module 202, a processor 204, and a memory 206. Communication module 202 allows user device 200 to communicate with other systems, such as communication networks, other user devices, attribute detection system 100, and the like. Processor 204 executes various instructions to implement the functionality described herein with respect to user device 200. Memory 206 stores instructions as well as other data used by processor 204 and other modules contained in user device 200.

User device 200 also includes a display generator 208, which generates various signals that enable a user display device to present information to a user of the device 200. In some embodiments, display generator 208 generates various signals that present a user interface to the user of user device 200. In particular implementations, display generator 208 includes, or is coupled to, a display device to present information to the user of the device. This user interface allows a user to, for example, submit a product search query to attribute detection system 100. A user input device 210 allows a user to interact with user device 200. Example user input devices 210 include pointing devices, buttons, switches, touch-sensitive portions of a touch-sensitive display device, and the like. A data communication bus 212 allows the various systems and components of user device 200 to communicate with one another. In some embodiments, one or more of attribute detection system 100, memory device 110, attribute database 112, hash table database 114, processing device 120, attribute input module 122, search query attribute module 124, disambiguation module 126, Bloom filter module 128, and/or communication device 130 are embodied in computer-readable instructions in user device 200.

In operation, attribute detection system 100 is adapted to identify attributes and/or attribute values in search query text strings transmitted by a user. A positive match between a search query string and one or more attributes can be transmitted to disambiguation module 126 to determine if the match merely represents a non-attribute concept that happens to share commonalities with an actual attribute value. If the search query text string is determined to represent an attribute value, relevant search result objects may be returned to the user. Such search result objects may comprise items having the attribute values identified in the search query text string.

Figure 3:
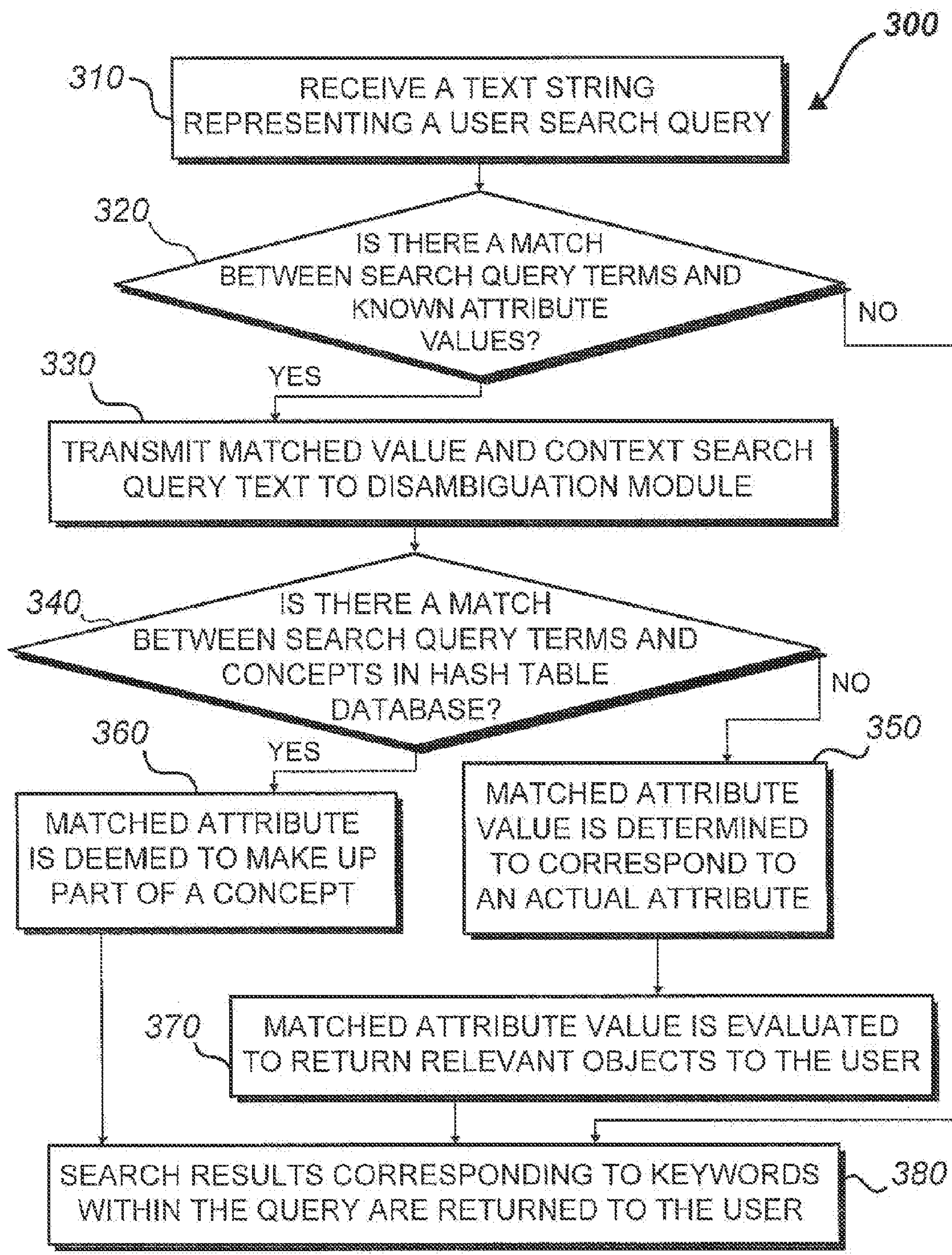
FIG. 3 is a flow diagram illustrating an example method for detecting an attribute in a search query in accordance with embodiments of the present disclosure.

Referring now to FIG. 3, a method 300 of identifying an item attribute according to embodiments of the present disclosure is illustrated. At operation 310, search query attribute module 124 receives a text string representing a user search query. At operation 320, search query attribute module 124 compares strings from the search query to values in attribute database 112. In embodiments, search query attribute module 124 can parse segments of the text string to individual words or combinations or words. At operation 330, if search query attribute module 124 makes a positive match between a search query text string and an attribute value in attribute database 112, a one or more search query strings containing the matched value are transmitted to disambiguation module 126. At operation 340, disambiguation module 126 compares a hash of the matched search query string to concepts in hash table database 114 to determine if the matched attribute should be interpreted as an attribute or a non-attribute concept by testing if the string is found with the set in the Bloom filter table. At operation 350, if the matched attribute value is found to not be a member of the set mapped onto the Bloom filter table 114, the string may be deemed to not represent a non-attribute concept. Accordingly, the matched attribute value is determined to be an actual attribute value. At operation 360, if the matched attribute is found to possibly be contained in the hash table database 114, then that matched attribute is deemed to make up part of a non-attribute concept. At operation 370, the matched attribute value that comprises an item attribute is evaluated to identify relevant objects to the user. In embodiments, relevant objects comprise items that have the qualities or attributes specified by user. At operation 380, search results corresponding to keywords and/or attributes are returned to the user. Objects relating to any identified attribute values in the search string may be returned to the user. A keyword search may be executed of the search query text in a product database and also returned to the user.

Figure 4:
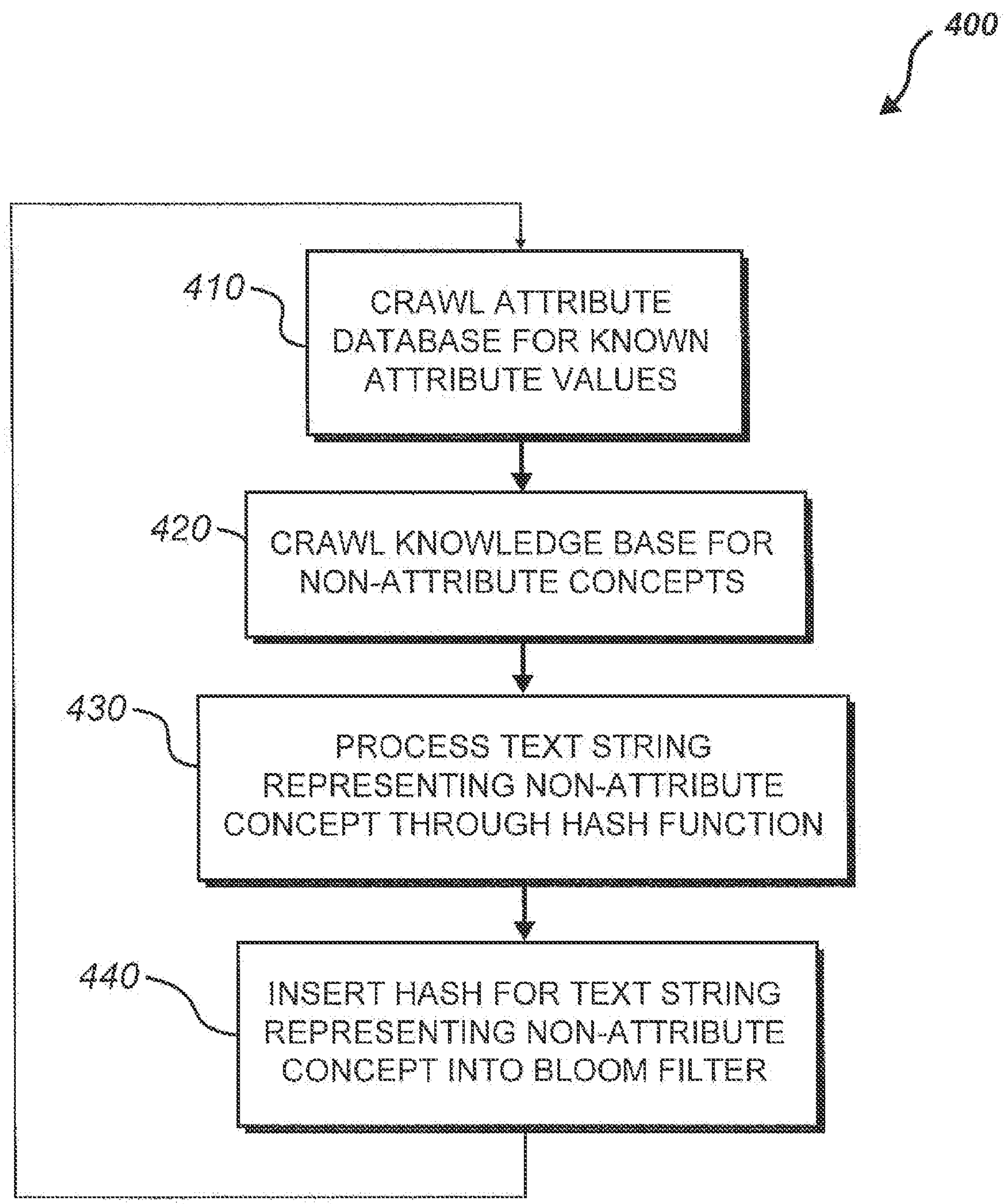
FIG. 4 is a flow diagram illustrating an example method for creating a Bloom filter for non-attribute concepts in accordance with embodiments of the present disclosure.

Referring now to FIG. 4, a method 400 of adding non-attribute concepts to a Bloom filter table accordingly to embodiments of the present disclosure is illustrated. At operation 410, Bloom filter module 128 crawls attribute database 112 for attribute values. At operation 420, for each attribute value identified, Bloom filter module crawls knowledge base to determine if the attribute value is also represented in a non-attribute concept. If a positive match is made, at operation 430, Bloom filter module processes the text string representing the non-attribute concept through a hash function. At operation 440, the resultant hash is inserted into the Bloom filter table at hash table database 114. If multiple non-attribute concepts were identified for the attribute value, operations 430 and 440 may be repeated for each non-attribute concept. Method 400 may be repeated for each attribute value in database 112 and may be occasionally repeated to continue to update and augment the Bloom filter table.

In embodiments, a search to determine if a candidate attribute value is actually a non-attribute concept may be executed directly on a knowledge base. In embodiments, a knowledge base is imported or created and stored in attribute database 112 or other internal database within system 100. In alternative embodiments, a search is executed on external knowledge database 150.

In embodiments of the present disclosure, one or more components of system 100 are installed as software modules on a user computing device 200. Such a computing device 200 may comprise a personal computer, a laptop, a handheld device, a tablet, or other like devices. In embodiments, user computing device 200 stores hash table database 114 in its memory 206. In analyzing a search string according to methods described above, processor 204 may process the search string Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of identifying an item attribute in a search query, comprising:

at a search query attribute module, receiving the search query from a user;

at the search query attribute module, comparing a string from the search query to a value in an attribute database, thereby resulting in a matched attribute string;

at a disambiguation module, processing the matched attribute string through a hash function, thereby resulting in a hashed attribute string;

at the disambiguation module, comparing the hashed attribute string to a Bloom filter table to determine if the matched attribute string does not belong to a set of known non-attribute concepts; and if the matched attribute string does not belong to the set of known non-attribute concepts:

transmitting an item object to the user, wherein the item object comprises an attribute value that corresponds to the matched attribute string.

2. The method of claim 1, wherein receiving the search query comprises processing a voice command.

3. The method of claim 1, further comprising:

performing a keyword search of the search query in a product database.

4. The method of claim 1, further comprising:

performing a search of the matched attribute string in a product database.

5. The method of claim 1, further comprising:

at a Bloom filter module, retrieving an attribute value from a product database;

at the Bloom filter module, searching for a match to the attribute value in the attribute database, thereby resulting in a matched attribute value;

at the Bloom filter module, searching for the matched attribute value in a knowledge base, thereby resulting in a matched non-attribute concept;

at the Bloom filter module, processing a text string representing the matched non-attribute concept through the hash function, thereby resulting in a hashed non-attribute concept; and inserting the hashed non-attribute concept into the Bloom filter table.

6. The method of claim 5, wherein the knowledge base comprises Wikipedia.

7. A computer-implemented method of identifying an item attribute in a search query, comprising:

at a disambiguation module of a user computing device, receiving the search query from a user;

at the disambiguation module, processing at least a portion of the search query through a hash function, thereby resulting in a hashed attribute string, wherein the at least the portion of the search query comprises a queried attribute value;

at the disambiguation module, comparing the hashed attribute string to a Bloom filter table to determine if the search query belongs to a set of known non-attribute concepts; and if the hashed attribute string does not belong to the set of known non-attribute concepts:

displaying an item object to the user, wherein the item object comprises the queried attribute value that corresponds to the search query.

8. The method of claim 7, wherein receiving the search query comprises processing a voice command.

9. The method of claim 7, further comprising:

at a search query attribute module, comparing the search query to a value in an attribute database.

10. The method of claim 7, further comprising:

performing a keyword search for the search query in a product database.

11. The method of claim 7, further comprising:

performing a search for an attribute object in a product database, wherein the attribute object comprises the queried attribute value.

12. The method of claim 7, further comprising:

at a Bloom filter module, retrieving an attribute value from a product database;

at the Bloom filter module, searching for a match to the attribute value in an attribute database, thereby resulting in a matched attribute value;

at the Bloom filter module, searching for the matched attribute value in a knowledge base, thereby resulting in a matched non-attribute concept;

at the Bloom filter module, processing a text string representing the matched non-attribute concept through the hash function, thereby resulting in a hashed non-attribute concept; and inserting the hashed non-attribute concept into the Bloom filter table.

13. A system for identifying an item attribute in a search query, comprising:

an attribute database adapted to store attribute values;

a search query attribute module comprising a search query attribute memory device and a search query attribute processing device, the search query attribute memory device storing computer-readable instructions directing the search query attribute processing device to query the attribute database for matches between a query string of the search query received from a user and the attribute values in the attribute database; and a disambiguation module comprising a disambiguation memory device and a disambiguation processing device, the disambiguation memory device storing computer-readable instructions directing the disambiguation processing device to:

process the query string through a hash function, thereby resulting in a hashed query;

compare the hashed query against a Bloom filter table, wherein the Bloom filter table comprises a representative set of non-attribute concepts; and in response to not finding a match in the Bloom filter table, return a search result to the user, wherein the search result comprises an item object with a matching attribute value to the query string.

14. The system of claim 13, wherein the system comprises computer-readable instructions stored in a memory of a mobile computing device.

15. The system of claim 14, further comprising a voice command module comprising a voice command memory device and a voice command processing device, the voice command memory device storing computer-readable instructions directing the voice command processing device to receive a voice command from the user and translate the voice command to the query string.

16. The system of claim 13, wherein the system comprises a network server.

17. The system of claim 16, further comprising a voice command module comprising a voice command memory device and a voice command processing device, the voice command memory device storing computer-readable instructions directing the voice command processing device to receive a voice command from the user and translate the voice command to the query string.

18. The system of claim 13, wherein the Bloom filter table is stored on the disambiguation memory device.

19. The system of claim 13, further comprising a Bloom filter module comprising a Bloom filter memory device and a Bloom filter processing device, the Bloom filter memory device storing computer-readable instructions directing the Bloom filter processing device to:

crawl a knowledge base;

process a non-attribute concept from the knowledge base through the hash function, thereby resulting in a hashed non-attribute concept; and insert the hashed non-attribute concept into the Bloom filter table.

20. The system of claim 19, wherein the knowledge base comprises Wikipedia.

* * * * *